(12) United States Patent
Wilhelmi et al.

(10) Patent No.: US 9,474,201 B2
(45) Date of Patent: Oct. 25, 2016

(54) SEED DISC WITH INTEGRATED DRIVE

(71) Applicant: Kinze Manufacturing, Inc., Williamsburg, IA (US)

(72) Inventors: Matthew J. Wilhelmi, Parnell, IA (US); Merlan Rolffs, Pella, IA (US); Dustan Hahn, Williamsburg, IA (US); John P. Mulherin, Cedar Rapids, IA (US); Courtney N. Achen, Iowa City, IA (US); Michael J. Myers, Williamsburg, IA (US); Ryan Legge, Cedar Rapids, IA (US); Rhett Schildroth, North Liberty, IA (US); Marvin Bachman, Marengo, IA (US); Todd E. Kniffen, Williamsburg, IA (US)

(73) Assignee: Kinze Manufacturing, Inc., Williamsburg, IA (US)

(*) Notice: Subject to any disclaimer, the term of this patent is extended or adjusted under 35 U.S.C. 154(b) by 0 days.

(21) Appl. No.: 14/592,965

(22) Filed: Jan. 9, 2015

(65) Prior Publication Data

US 2015/0189826 A1 Jul. 9, 2015

Related U.S. Application Data

(60) Provisional application No. 61/925,518, filed on Jan. 9, 2014.

(51) Int. Cl.
*A01C 7/04* (2006.01)
*A01C 19/02* (2006.01)

(52) U.S. Cl.
CPC ............... *A01C 7/046* (2013.01); *A01C 19/02* (2013.01)

(58) Field of Classification Search
CPC ............ A01C 7/00; A01C 7/04; A01C 7/18; A01C 7/046; A01C 19/02
USPC ................................... 111/170, 177
See application file for complete search history.

(56) References Cited

U.S. PATENT DOCUMENTS 4,554,473 A 11/1985 Muller
8,281,725 B2 * 10/2012 Wendte .................. A01C 19/02
111/185

(Continued)

FOREIGN PATENT DOCUMENTS

EP 2486781 A1 8/2012
WO 2012142558 A1 10/2012

OTHER PUBLICATIONS

Kinze Manufacturing, Inc., PCT/US2015/010784 "Notification of Transmittal of the International Search Report and the Written Opinion of the International Searching Authority", 9 pages, mailed May 7, 2015.

*Primary Examiner* — John G Weiss
(74) *Attorney, Agent, or Firm* — McKee, Voorhees & Sease, PLC

(57) ABSTRACT

An agricultural planter includes a plurality of row units attached to a toolbar. The row units include seed meters for receiving, singulating, and dispensing seed or other particulate. The seed meters include a circular seed disc with a seed path for receiving the seed in the seed meter housing. Integrated with the seed disc is a motor that is housed within the seed meter housing and that includes a rotatable portion being attached to the circular disc such that the two rotate in tandem. The integrated motor can be positioned within an interior portion of the circular seed disc such that the width of the disc and motor combination is kept to a minimum.

20 Claims, 13 Drawing Sheets

(56) References Cited

U.S. PATENT DOCUMENTS

| | | | | |
|---|---|---|---|---|
| 8,375,873 B2* | 2/2013 | Nelson | ................... | A01C 7/046 111/185 |
| 9,155,241 B2* | 10/2015 | Rans | ...................... | A01C 7/046 |
| 2006/0278726 A1 | 12/2006 | Holly | | |
| 2009/0000533 A1* | 1/2009 | Wendte | ................... | A01C 7/046 111/183 |
| 2011/0120356 A1 | 5/2011 | Wendte et al. | | |
| 2013/0019788 A1 | 1/2013 | Bragatto | | |

* cited by examiner

SEED DISC WITH INTEGRATED DRIVE

CROSS REFERENCE TO RELATED APPLICATIONS

This application claims priority under 35 U.S.C. §119 to provisional application Ser. No. 61/925,518, filed Jan. 9, 2014, herein incorporated by reference in its entirety.

FIELD OF THE INVENTION

The invention relates generally to agricultural implements for planting seed. More particular, but not exclusively, the invention relates to a seed disc and meter of a planter having an integrated motor to reduce the width of the seed meter and to provide a row unit for the planter with varying configurations.

BACKGROUND OF THE INVENTION

An agricultural row crop planter is a machine built for precisely distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing and a seed disc. The housing is constructed such that it creates a reservoir to hold a seed pool. The seed pool may also be in a separate structure. The seed disc resides within the housing and rotates about a generally horizontal central axis. As the seed disc rotates, it passes through the seed pool where it picks up individual seeds. The seeds are subsequently dispensed into a seed chute where they drop into the seed furrow.

Seed spacing in the seed furrow is controlled by varying the rotational speed of the seed disc. Most commonly, seed disc rotation is driven by connection to a common driveshaft. The driveshaft runs horizontally along the length of the toolbar to connect to each row unit, and is driven by a single motor or a ground contact wheel. In this configuration, the planting rate can be adjusted for all row units uniformly by adjusting the rotational speed of the common drive shaft. This can be a tedious task, and an operator is unlikely to adjust the gear ratio as often as necessary to maximize yields. Generally, an optimal overall rate for a given acreage will be selected prior to planting and will be maintained at that rate regardless of soil conditions. Whether using a mechanical, air, or vacuum style seed disc, the seed disc is installed inside of the seed meter using independent fasteners and requires the use of tools to facilitate changing the disc. For example, if a farmer uses the same planter to plant corn and soybeans, he would use a different disc for the respective seed types. With planters continuing to grow in size, and more row units being added, the task of changing seed discs using independent fasteners and tools adds unnecessary burden to changing out seed discs.

More recently, planters have been designed to provide for independent driving of each of the seed discs in each seed meter. The meters include a motor, such as an electric motor, that is attached to the meter. For example, a DC brushless motor can be utilized, which includes an output shaft. The output shaft extends from the motor and into the meter such that a portion of the shaft is operatively connected to the seed disc. Therefore, the motor will operate to rotate the seed disc.

However, when electrically driving seed meters, the electric motor must either directly drive the seed disc via a hub or other connection method. The motor being used is placed axially and is detached from the seed disc, which increases the axial width of the seed meter. This setup makes motor removal and installation difficult. Another method is to transfer power to the seed disc through gears, belts, or other power-transmitting means, which allows the motor to be placed in a more suitable location and making it easier to service. These attempts have had the seed disc divorced from the drive motor, with power being transferred through gears, belts, etc., or the disc had to be directly attached to the output shaft of the motor, which would cause the system to have an increase in axial length since gear reduction would have to be done in the motor to slow the speed down to sufficient levels.

Therefore, there is a need in the art for a seed meter including a seed disc that has a smaller width than that of a seed meter being driven by an external, electric drive motor. There is also a need in the art for a meter that includes a modular-type disc driving motor that can be quickly attached to different seed discs used to distribute and plant different types of seed.

SUMMARY OF THE INVENTION

Therefore, it is a principal object, feature, and/or advantage of the present invention to overcome the deficiencies in the art.

It is another object, feature, and/or advantage of the present invention to provide a seed disc with an integrated electric motor for driving the rotation of the disc.

It is still another object, feature, and/or advantage of the present invention to provide a motor for driving the rotation of a seed disc in which the motor includes a relatively stationary inner member and a rotatable outer member.

It is yet another object, feature, and/or advantage of the present invention to provide a seed disc motor that can be easily and quickly attached to different seed discs to allow the changing of seed to be planted.

It is a further object, feature, and/or advantage of the present invention to provide a seed disc that is ring-shaped with a seed cell path spaced radially about the ring.

It is still a further object, feature, and/or advantage of the present invention to provide a fan integrated with a housing of a seed meter to provide for a pressure differential along a portion of the seed disc to urge seed in contact with a seed cell of a seed disc.

It is yet a further object, feature, and/or advantage of the present invention to provide a row unit or a planter with a plurality of seed meters positioned thereon. It is still a further object, feature, and/or advantage of the present invention to provide a row unit of a planter in which the seed meter is positioned adjacent the opening wheels of the unit.

These and/or other objects, features, and advantages of the present invention will be apparent to those skilled in the art. The present invention is not to be limited to or by these objects, features and advantages. No single embodiment need provide each and every object, feature, or advantage.

Therefore, some aspects of the invention include incorporating a large diameter motor with a narrow axial width into communication with a seed disc. A reversed armature arrangement is utilized such that the output shaft (inner member) of the motor is fixed and the outside of the motor is allowed to spin. The outside of the motor can form a quick attach hub, in which a seed disc ring is attached. This allows for the motor to be enclosed inside the protective environment of the seed meter housing, and provides open access to service the motor. In this case, the inner member of the motor becomes the stator and the outer member of the motor becomes the rotor.

The motor may be a brushless DC motor, or may even be a brushed DC motor. Some embodiments contemplate the use of a stepper motor. Furthermore, additional embodiments contemplate the addition of magnets or magnetic materials within the circular member of the seed disc itself, in which the seed disc becomes the rotor of the motor assembly. The motor can be integrated with the seed disc such that a portion of the seed disc surrounds or is otherwise positioned around at least a portion of the circumference of the motor. Alternatively, the motor can be positioned such that it is adjacent or otherwise at least partially surrounding a portion of the seed disc including the seed cells and/or seed path. However, the integration of the motor and seed disc can provide that the two are combined such that they comprise a single unit, which may include multiple components.

Some aspects of the invention include that the motor includes members that rotate the seed disc through bearing members surrounding a lip portion of the seed disc. In such a situation, the seed disc may be magnetically levitated within the system to position the seed disc.

Other aspects of the invention include the use of a single stator or inner portion of a motor that is used to power separate rotors of separate seed discs. In such a situation, the single rotor would act upon the magnets of the separate rotor portions operatively attached to the seed disc to cause one or both of the discs to rotate at a time. This would allow multiple meters to be used at each row unit, which would enable multiple hybrids of particulate material to be planted.

Still other aspects of the invention include the integration of a fan into either a single meter housing or between meter housings. The fan could replace air hoses, and can be used to provide a pressure differential, either positive or negative, at the seed cells of the seed discs to urge seed or other particulate material to be held at and against the seed disc. The fan can be positioned either coaxially with the seed disc or at another location and attached to the seed meter housing. The use of the integrated fan and motor would greatly reduce the width of the seed meter, which would provide for numerous applications. For example, reducing the width could allow for multiple seed meters to be positioned at each row unit to provide for different applications of particulate materials. The meters could also be moved closer to the ground to release seed or other materials at a location close to the ground, which would enhance seed spacing, depth, and other planting characteristics. The invention could also result in the removal of many parts of standard seed meters, which reduce the complexity of the meters, number of components, and thus, number of components that would need replacing, maintained, or otherwise, while increasing the durability.

Figure 1:
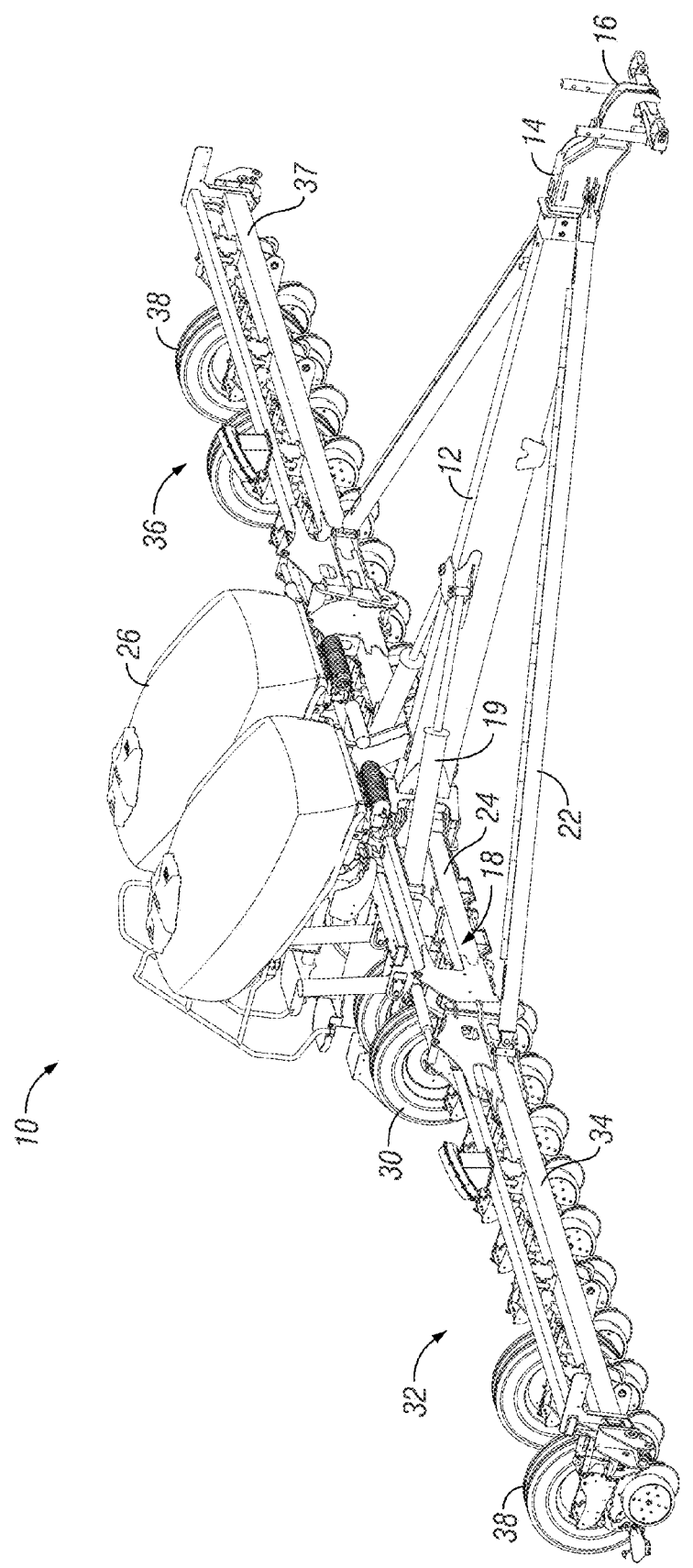
FIG. 1 is a perspective view of a planting implement.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 is a perspective view of an exemplary embodiment of an agricultural implement 10, which is shown as a planting implement. Such a planter 10 is further shown and described in U.S. patent application Ser. No. 13/927,177, which is hereby incorporated in its entirety. FIG. 1 shows the planter 10 with a tongue 12, which may be a telescoping tongue when the planter 10 is a forward folding planter. A hitch 16 is positioned at the first end 14 of the tongue 12, and is used to attach the planting implement 10 to a tractor (not shown) or other vehicle for pulling the planting implement 10. When the tongue 12 is a telescoping tongue, it may be aided by the addition of draft links 22 on opposite sides of the tongue 12. The draft links 22 connect the tongue 12 to first and second wings 32, 36, such that when the wings fold by operation of cylinders 18, the supports 22 will extend or retract sections of the telescoping tongue 12 to lengthen or shorten the tongue 12 so that the wings 32, 36 are able to be folded adjacent one another and the tongue 12.

Positioned at or near a rear end of the tongue 12 is a main or central frame 18, which may also be known as a toolbar. The main or central frame 18 extends generally perpendicular to the tongue 12. The central frame 18 also includes structure for central hoppers 26. The main hopper 26 which may also be known as bulk fill hoppers, central hoppers, or other tanks, house materials, such as seed, insecticide, fertilizer, or the like, which is distributed through a system to individual row units on the frame and wings. For example, the bulk fill hoppers may be operably connected to an air seed delivery system for delivering seed from the bulk fill hoppers to individual row units. Such an air seed delivery system is disclosed in U.S. Pat. No. 8,448,585, which is hereby incorporated in its entirety. The central fame includes a plurality of central row units extending from the rear of the frame to distribute the material to a field. The central frame also includes an axle and transport wheels 30 extending from the frame. The transport wheels 30 support the main or central frame and are also the wheels that contact the ground when the implement 10 is transported to or from a field.

Extending from opposite sides of the central frame or main frame 24 are first and second wings 32, 36. The first and second wings 32, 36 generally mirror one another, and therefore, only one wing will be described. It should be appreciated that opposite wing 36 is generally the same components. The first wing 32 includes a first frame 34 extending separate from, but extending generally in the same plane as the main frame 24. A plurality of row units is connected to the first frame 34. The row units of the first wing 32 are generally the same as the row units of the main frame 24 and that of the opposite wing 36, which extend from the second wing frame 34. The number of row units with implement 10 may vary depending on the size of the implement 10, the requirements of the field, type of field, the type of material being distributed to the field, and the like. Also extending from the wing frame 34 are wing wheels 38. The wing wheels 38 support the wings 32, 36 and allow the implement 10 to be moved without the row units penetrating the ground when turning in the field, crossing waterways, or the like.

Figure 2:
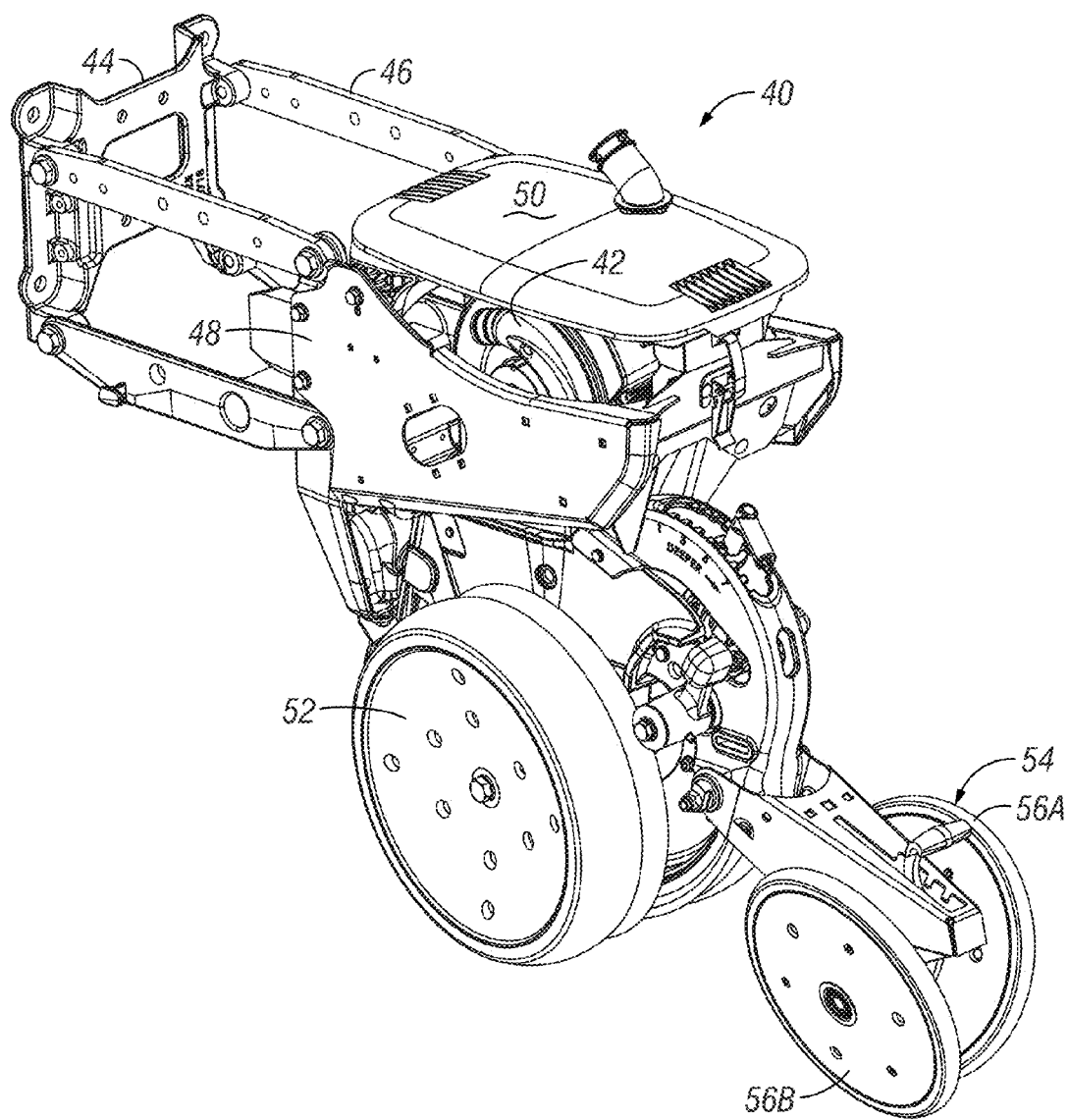
FIG. 2 is a perspective view of a conventional planter row unit with an air seed meter attached thereto.
Figure 3:
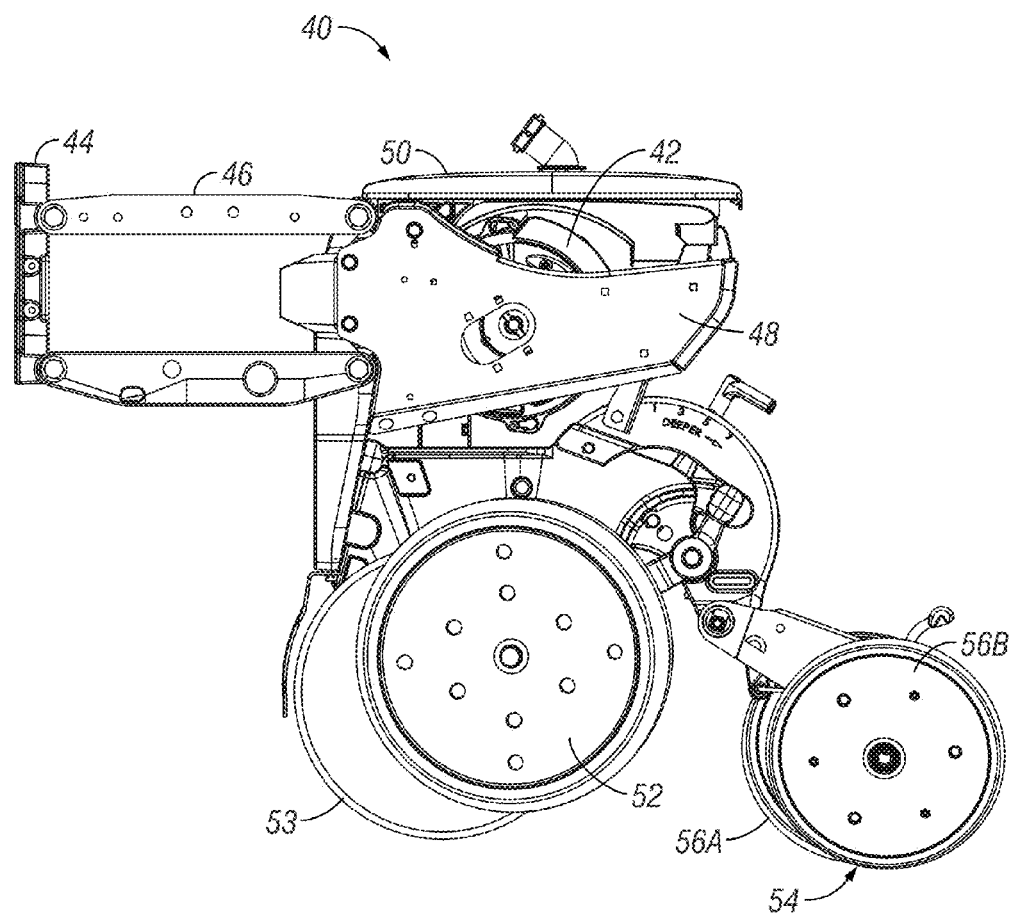
FIG. 3 is a side elevation view of the conventional row unit of FIG. 1.

The implement 10 includes a plurality of row units 40 extending from the wings 32, 36 and the central frame 24. A conventional planter row unit 40 with an air seed meter 42 positioned therewith is shown in FIGS. 2 and 3. For example, the seed meter may utilize negative or positive pressure caused by air to retain and transport seed. The row unit 40 and air seed meter 42 may be of the kind shown and described in U.S. patent application Ser. No. 13/829,726, which is hereby incorporated in its entirety. The invention contemplates other types of seed meters, including mechanical, brush, finger, or the like, which may be used with the present invention. The row unit 40 includes a U-bolt mount for mounting the row unit 40 to the planter frame or tool bar (on central frame and wings), as it is sometimes called, which may be a steel tube of 5 by 7 inches (although other sizes are used). However, other mounting structures could be used in place of the U-bolt. The mount includes a face plate 44, which is used to mount left and right parallel linkages 46. Each linkage may be a four bar linkage, as is shown in the figures. The double linkage is sometimes described as having upper parallel links and lower parallel links, and the rear ends of the parallel links are pivotally mounted to the frame 48 of the row unit 40. The frame 48 includes a support for the air seed meter 42 and seed hopper 50, as well as a structure including a shank for mounting a pair of ground gage wheels 58. The frame 48 is also mounted to a closing unit 54, which includes a pair of inclined closing wheels 56A, 56B. The row unit 40 also includes a pair of opener discs 53. While the row unit 40 shown in FIGS. 2 and 3 is configured to be used with a bulk fill seed system, it is to be appreciated that the row unit 40 may have one or more row hoppers 50 at each of the row units 40. Exemplary versions of row units with individual hoppers is shown and described in U.S. patent application Ser. No. 14/176,198, which is hereby incorporated in its entirety.

As mentioned, the implement 10 and row units 40 shown and described in FIGS. 1-3 include an air seed meter 42 for singulating and transporting seed or other particulate material from the seed delivery source to the created furrow in the field prior to the closing wheels 56 closing said furrow.

Figure 4:
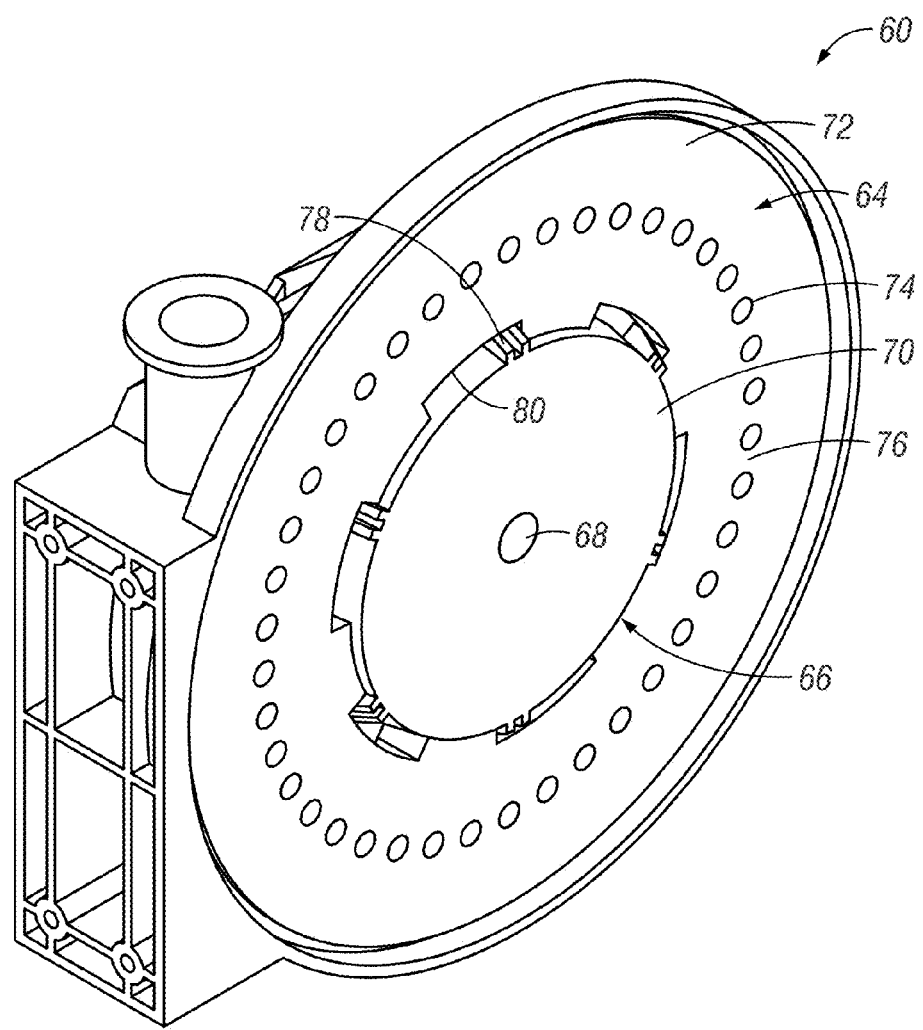
FIG. 4 is a perspective view of a seed disc with an integrated motor according to the present invention.
Figure 5:
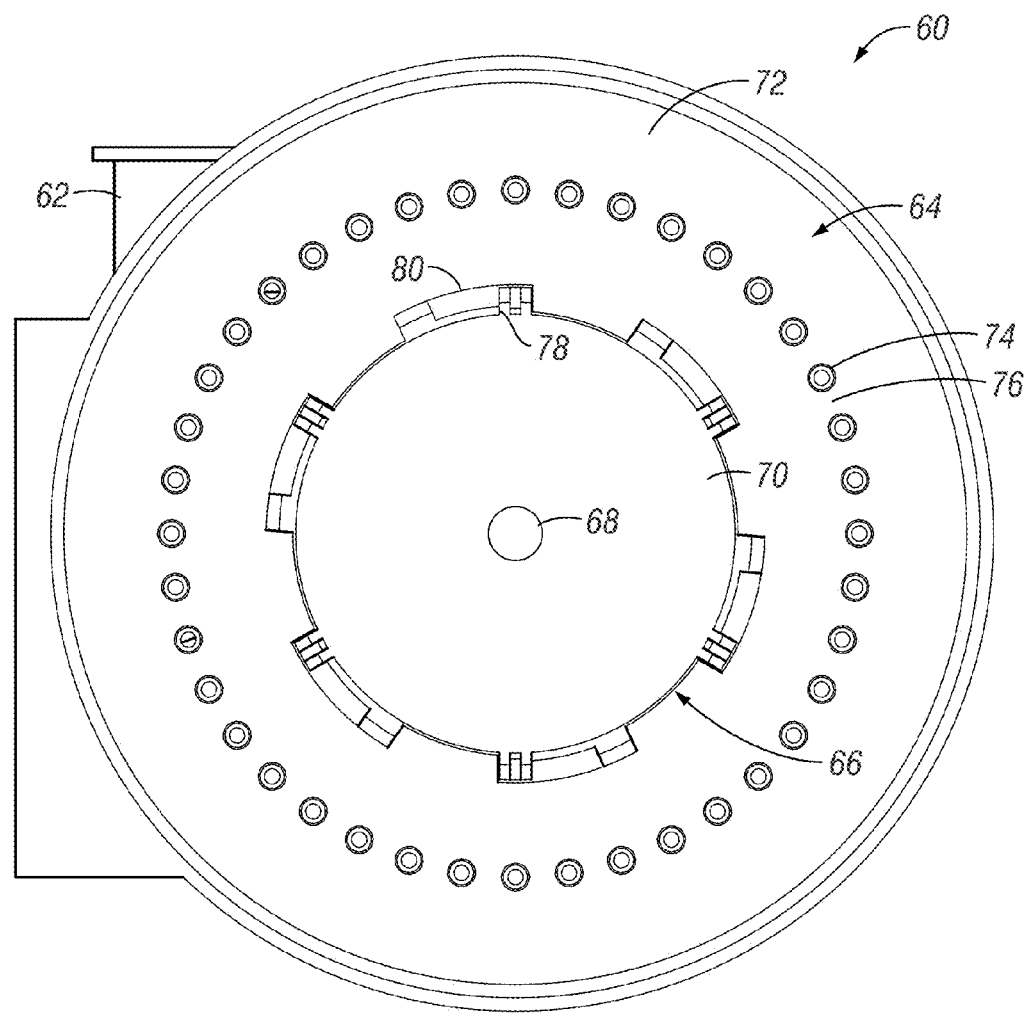
FIG. 5 is a front elevation view of the seed disc of FIG. 4.
Figure 6:
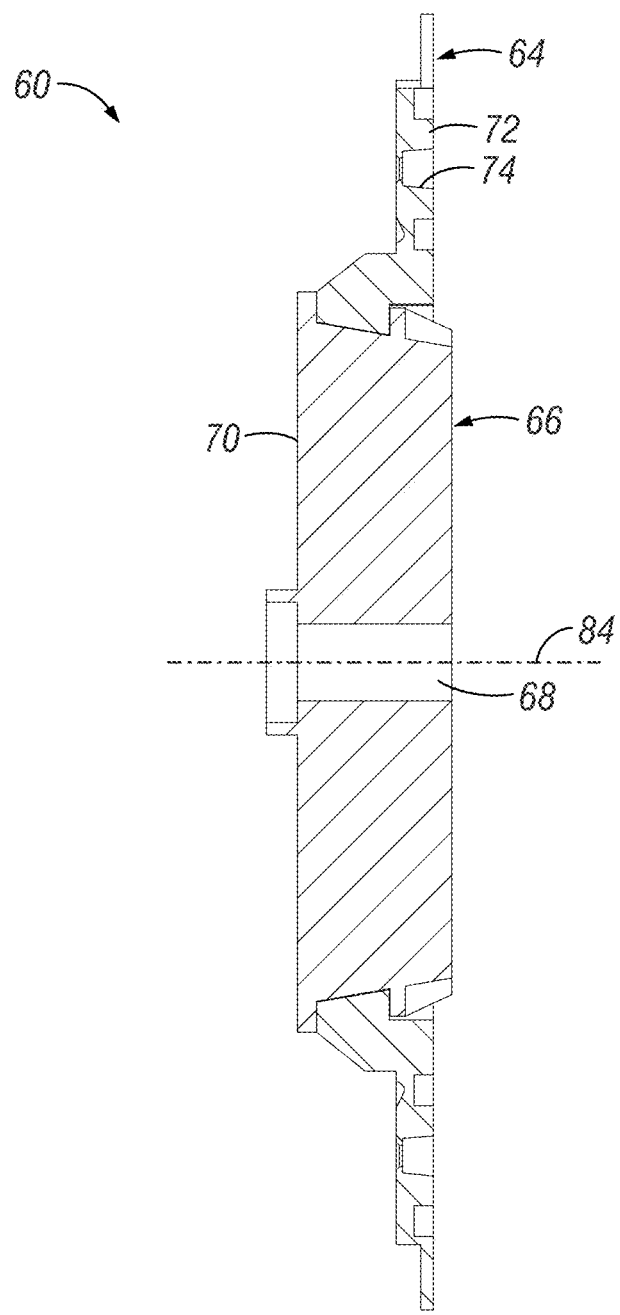
FIG. 6 is a sectional view of the seed disc of FIG. 4.

An aspect of the present invention includes a novel seed meter 60 including a seed disc assembly 64, such as that shown in FIGS. 4-6. Previous seed meters 60 have used various types of drive systems to rotate the seed disc 64 of the seed meter 60 in order to singulate and transport the seed or other particulate material via the seed meter 60 to the ground, such as in a trench formed in the ground. Some such systems include direct drive systems in which a chain or other member is operatively connected to one or more wheel axles for rotating approximately the same ground speed of the wheels. Still others have included the use of an electrical drive motors positioned at each seed meter in order to drive the seed disc of the meter via an output shaft of the motor. Such a situation includes mounting of a motor adjacent or to the seed meter 60 with the output shaft extending into the seed meter 60 and into contact with the seed disc 64 to drive the seed disc 64 in a rotational manner. For example, previous electrical motors include DC brushless motors, which require numerous gear reductions within the motor, which cause the size of the motor to increase. However, one drawback of such previous systems included that the motor must be configured and sized such that the size of the motor causes the size of the seed meter to be wide, which takes up a great deal of the space of the row unit.

Therefore, it is an aspect of the present invention to provide for the replacement of said external drive motors of the seed meters 60 with an integrated brushless DC motor 66 with the seed disc 64 itself, in order to reduce the width of the seed meter 60, which will provide numerous advantages and benefits over prior seed meters. Such a seed meter 60 is shown in FIGS. 4-6.

Brushless DC motors generally include a rotor and a stator. The outer member of the motor is generally referred to as the stator, as it is generally stationary during operation of the motor. The stator includes magnets that are wound with electric coils, in which an electric current can be passed therethrough to operate the motor. At the interior of the motor is a permanent magnet with opposing poles. Electricity is passed through the wires winding around the magnets of the stator, which cause rotation of the permanent magnet of the rotor. This rotation can then be transferred via gears and other transferring mechanisms to provide rotation of an output shaft. However, due to the required gear reduction of the motors, the housing of the brushless DC motor must be rather large in order to house all of the components of the brushless DC motor. The present invention contemplates the use of a novel configuration of a brushless DC motor in which the rotor, which may also be referred to as an armature, and the stator are reversed. The reversal of the armature and the stator house different components of the motor to rotate upon actuation of the motor, which will provide many unique and advantageous benefits to a seed disc used in a seed meter.

The invention contemplates the reversal of the rotor 70 and stator 68 of the brushless DC motor, which then may be integrated with the seed disc 64 itself. This integration of the motor 66 and the seed disc 64 provides a motor 66 that can be housed within the seed meter housing 62, along with the seed disc 64 itself. For example, the combined seed disc and motor may form an integrated, one-piece unit, or can be multiple components combined to interact with one another. This eliminates the need of an external drive mechanism for the seed meter 60, protects the motor 66 from many external elements, and greatly reduces the width required for seed meter 60, which allows for many variations to be made to the components of a row unit 40, which have been heretofore unforeseen in the agricultural industry.

Such exemplary applications for a seed meter 60 including a seed disc 64 with an integrated motor 66 within a seed meter housing 62 will be shown and described.

FIGS. 4-6 illustrate one aspect of a seed meter 60 including a motor 66 integrated with a seed disc 64. It should first be noted that the term integration does not require that the motor be within the outer profile or within the circumference of the seed disc 64. Instead, the term can be used to describe an assembly in which the motor 66 of the seed disc 64 is directly driving the seed disc 64 in a manner in which the motor 66 is directly or otherwise operatively attached to the seed disc 64 or otherwise included as part of the seed disc 64 and, in some embodiments, all within the seed meter hosing 62.

As shown in FIGS. 4-6, a seed meter 60 includes a housing 62 for substantially surrounding a seed disc assembly 64. The seed disc assembly 64 includes a generally circular seed disc member 72, which is able to rotate within the seed meter housing 62 to attach a seed or other particulate material at a seed cell 74 to distribute the seed or other particulate material to the ground. The circular member 72 includes a plurality of seed cells 74 radially spaced from a central axis thereof and forming a seed cell path 76 through which the seed cells 74 will rotate. In the embodiments shown in FIGS. 4-6, the circular member 72 of the seed disc 64 is a generally ring-shaped disc with an aperture or other hollow interior portion. Positioned within the open area of the ring-shaped seed disc member 72 is a motor 66 for providing a rotational drive mechanism to the seed disc 64. The motor 66 shown in the figures may be a brushless DC motor. However, as mentioned, the components of the motor 66 have been reversed such that the inner member 68 is substantially stationary, and may be referred to as a stator 68, while the outer portion 70 may be referred to as the rotor 70 or armature, and is capable of rotating relative to the inner member 68. Therefore, it is contemplated that the magnets and windings of the inner and outer members 68, 70 may be reversed to provide that a current supplied to the motor 66 will cause the rotation of the outer member 70 relative to the generally stationary inner member 68. The inner member 68 may then be attached to or otherwise affixed within the seed meter housing 62 in such a way that the outer member 70 is able to rotate relative to the inner member, while keeping the motor 66 generally in place within the housing 62.

Furthermore, the motor 66 may be attached to the ring-shaped seed disc member 72 via attachment member 78, 80 of the motor 66 and seed disc member 72. Thus, the assembly shown in FIGS. 4-6 may be generally modular in nature, such that different seed disc members 72 can be attached to a common motor 66 to provide for the planting of various seed types. For example, different seed types, such as corn, soybean, sweet corn, cotton, and the like, have varying sizes, shapes, and planting requirements and/or characteristics. The seed cells 74 and seed paths 76 are varied according to the type of seed in which the seed disc member 72 is to be used for planting. Therefore, another aspect of the invention provides for a common motor 66 to be used with differing seed disc members 72, which are configured to be used with the varying seed types. Thus, according to some embodiments, the motor includes outer attachment members 78, while the ring-shaped seed disc member 72 includes its own attachment members 80. The attachment members 78, 80 may be slidingly or otherwise engaged to one another such that the motor 66 is positioned with matching slots and openings, and then rotated to lock the motor 66 into connection with the disc member 72. When a different seed disc 64 is to be used, such as when a different seed is to be planted or if there is damage to the seed disc 64, the motor 66 can be quickly rotated to disengage with the disc member 72, and to allow for reengagement of a separate seed disc member 72. Thus, the embodiments shown may be generally modular in nature such that the seed disc assembly 64 can be quickly and easily changed to account for variations in the planting process.

Furthermore, as shown best in FIG. 6, the operation of the seed disc assembly 64 will not change based on the type of seed disc 72 used with the integrated motor 66. As shown in FIG. 6, the inner member 68 of the motor 66, outer member 70, and seed disc member 72, are generally coaxial with one another. They are coaxial about the central axis 84 of the seed disc assembly 64, within the seed meter 60. The inner and outer members 68, 70 of the motor 66 are configured such that the introduction of a current to the motor 66 will cause the outer member 70 to rotate about the substantially stationary inner member 68 of the motor 66. As the outer member 70 is attached to the ring-shaped seed disc 72, the seed disc member 72 will begin to rotate as well with the outer member 70 of the motor 66. This rotation will drive the seed disc 64 within the seed meter 60 to begin planting of the seed or application of the other particulate material. Thus, the remaining components of the seed meter 60 may be included, as is known. For example, when the seed meter 60 is an air seed meter, the seed meter housing 62 may include an attachment to an air source, such as a vacuum source. Furthermore, a seed pool of distributed seed may be included within the seed meter housing 62. The seed disc 64 with integrated motor 66 is operated to rotate the seed disc member 72 such that the seed cells 74 pass through the seed pool (not shown). At the same time, the air source provides a pressure differential on the opposing sides of the seed cells 74 such that the seed will become affixed at a seed cell 74 as the seed disc 64 passes through the seed pool. The seed meter 60 will continue rotation through a singulator (not shown), which aids in providing that only one seed be positioned at each seed cell 74. The meter 60 is continually rotated until a particular seed passes through a zone of no pressure differential, which dislodges the seed from the seed cell 74 of the seed disc 64. The seed is then passed through a chute or other member and towards a furrow, which has been created in the field. The seed closing wheels 56 of the row unit 40 then close the earth around the seed positioned in the seed furrow, thus planting the seed.

The use of an electric motor for driving the seed meter 60 provides numerous advantages over previous mechanical means for driving the seed meter 60. For example, the electric motor provides for greater torque and instant action of the rotation of the seed disc 64 in the seed meter 60. Furthermore, the individual integration of the electric motor with each seed disc 64 of the seed meter 60 allows for each of the seed meters 60 to be independently operated. The individual operation of each seed meter allows for numerous applications for planting. For example, when certain row units 40 of a planter pass over an area not to be planted, the controls of the system allow for the shut off of particular motors of the seed meters 60, which ensures that the location will not be planted by the row units 40. However, as other row units 40 can be independently controlled, the seed meters 60 will continue to operate at said units 40. Furthermore, the independent control of the seed meters 60 by the integrated motor, allows for multi seed meters 60 to be positioned at each row unit 40, such as for use with multi-hybrid planting. Thus, at each row unit 40, the electrically controlled motor can independently be operated to activate a particular seed meter 60 including a particular hybrid of seed, which will then plant that seed at a particular location in the field. However, when another hybrid of seed is to be planted, the first meter 60 can be shut off via the electric motor, while the second meter 60 activated instantaneously to begin planting of the second hybrid. Thus, the use of the electric motors integrated with the seed disc 64 of the seed meters 60 allows for two or even more seed meters 60 to be used at each row unit 40 to provide for the ability of multi-hybrid planting of the planter unit 10.

According to some embodiments, the motor 66 integrated with the seed disc member 72 of the seed disc 64 may include a diameter between 2-15 inches, while one is more preferred being of approximately 6½ inches. Doing so will require a motor that is approximately 1 to 1.5 inches wide and requires approximately 1.7 amps to activate and power. However, it is to be appreciated that other diameters, thicknesses, and energy requirements can be utilized with the invention, and can be selected based upon the requirements for planting. For example, it is contemplated that as the diameter of the motor increases, the thickness and energy required to operate will decrease. Having a motor with a width less than 1.5 inches will allow the motor to fit within existing seed meter housings. In addition, the inclusion of the motor within the housing will provide other advantages. For example, the seed meter housing 62 can now be formed with decreased width due to the removal of the external motor attached to the housing. It is contemplated that the housing can be in size to approximately two inches wide.

Other applications and/or benefits of reducing the width of the seed meter 60 including allowing the seed meter 60 to be positioned closer to the ground, and potentially between and behind the opening wheels of the row unit 40. Such a location would provide numerous benefits. For example, releasing a seed at a location close to the ground would reduce bounce of the seed before reaching the ground, would provide better accuracy for being placed in an opening of the ground, could improve efficiency for seed spacing, could allow for planting at greater speed through a field, and could provide additional benefits that may be apparent to those skilled in the art. The reduction of width of the seed meter housing 62 would allow the seed meter housing 62 to fit at locations heretofore unavailable. Furthermore, the inclusion of the motor within the seed meter housing 62 would protect the motor from external elements, such as dust and other debris. Still further, the use of the motor as shown and described will improve the efficiency of the motor as it does not include gear boxes, as previous DC electric motors have required. Other benefits include that the inclusion allows for increased diameter of the seed disc, which allows for motors to make a higher available torque at a lower speed.

Still further, while the motor has shown to be snap and rotatably fit to the ring-shaped seed disc member 72, other types of connections between the motor 66 and the seed disc member 72 may be contemplated. For example, to provide for the modularity of the seed disc 64 and motor 66, the members may be snap fit to one another. Furthermore, it is contemplated that the motor be permanently attached to a seed disc 64 as well. The invention is not to be limited to the specific ways of showing and describing the attachment between the motor and the seed disc member 72, and it is to be appreciated that any type of attachment between the motor and the seed disc 64 may be included as part of the invention.

Figure 7:
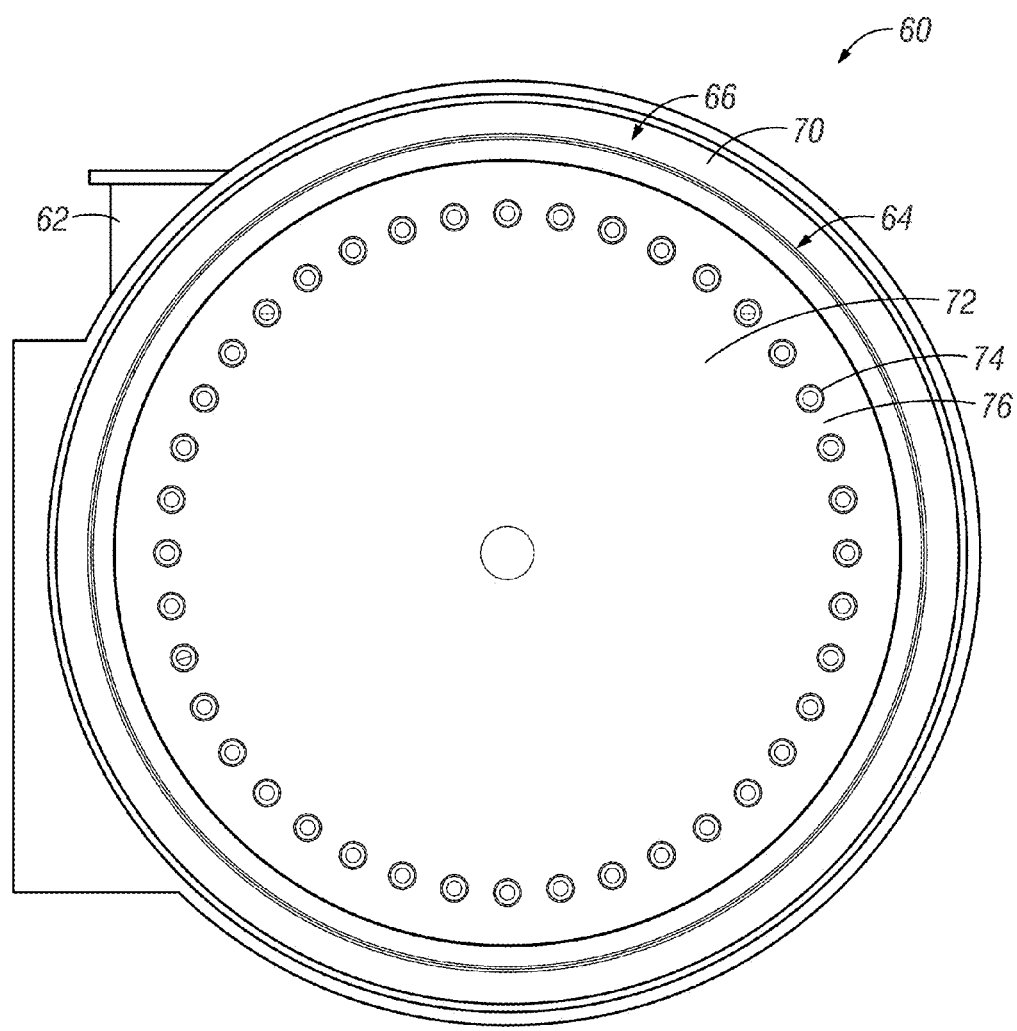
FIG. 7 is a front elevation view of a seed disc with an integrated motor according to additional aspects of the invention.

FIG. 7 discloses yet another aspect of the invention, which includes the integration of a motor 66 with a seed disc member 72 to form a seed disc assembly 64, which can be positioned within a seed meter housing 62 of a seed meter 60. FIG. 7 discloses an assembly in which the motor 66, which may be a brushless DC electric motor, is positioned adjacent to or at least partially surrounding the outer edge of the seed disc member 72. The seed disc member 72 includes a generally circular member that includes a plurality of seed cells 74 forming the seed path 76, in which the seed cells 74 are radially spaced from a central axis of the circular member 72. However, in the aspect shown in FIG. 7, the motor 76 is surrounding the seed disc member 72 or is adjacent the seed disc member 72 such that it is able to drive the seed disc member 72 about the outer portions of the disc member 72 within the seed member 60.

The motor 66, as shown in FIG. 7, includes an inner member 68 and an outer member 70. The inner member 68 in this particular embodiment may be the rotor or armature member, while the outer member be the substantially stationary stator member. Therefore, in this particular embodiment, the inner member 68 includes permanent magnets, while the outer member 70 includes magnetic members with electric coils wrapped around. The introduction of power to the coils operates the motor 66 such that the inner member 68 will begin to rotate, while the outer member 70 stays substantially stationary.

In such a configuration, the inner member 68 of the motor 66 shown in FIG. 7 will be operatively attached to the seed disc member 72, such that rotation of the inner member 68 will also cause the seed disc member 72 to rotate in unison therewith. Thus, the inner member 68 of the motor 66 can be attached, such as permanently or selectively affixing the inner member 68 to the disc member 72.

Furthermore, similar to the embodiment shown in FIG. 7, the seed meter 60 may include that the inner member 68, in line with the axis of the circular member 72 be the substantially stationary stator, and the portion referenced by numeral 68 in FIG. 7 be the outer armature or rotor member of the motor 66. Thus, in such a configuration, the outer member 70 will extend at least partially behind the disc member 72, and be attached out the outer edge of the seed disc member 72. Therefore, while the inner portion of the motor at the axis thereof remains stationary, the outer member 70 attached to the seed disc member 72 will begin to rotate, which causes rotation of the seed disc member 72 as well. This will pass the seed cell 74 through a seed pool of the seed meter 60, through a singulating device, and to a drop portion of the seed meter 60 such that the seed will be dislodged from the seed cell 74 and towards a furrow formed in the field.

Figure 8:
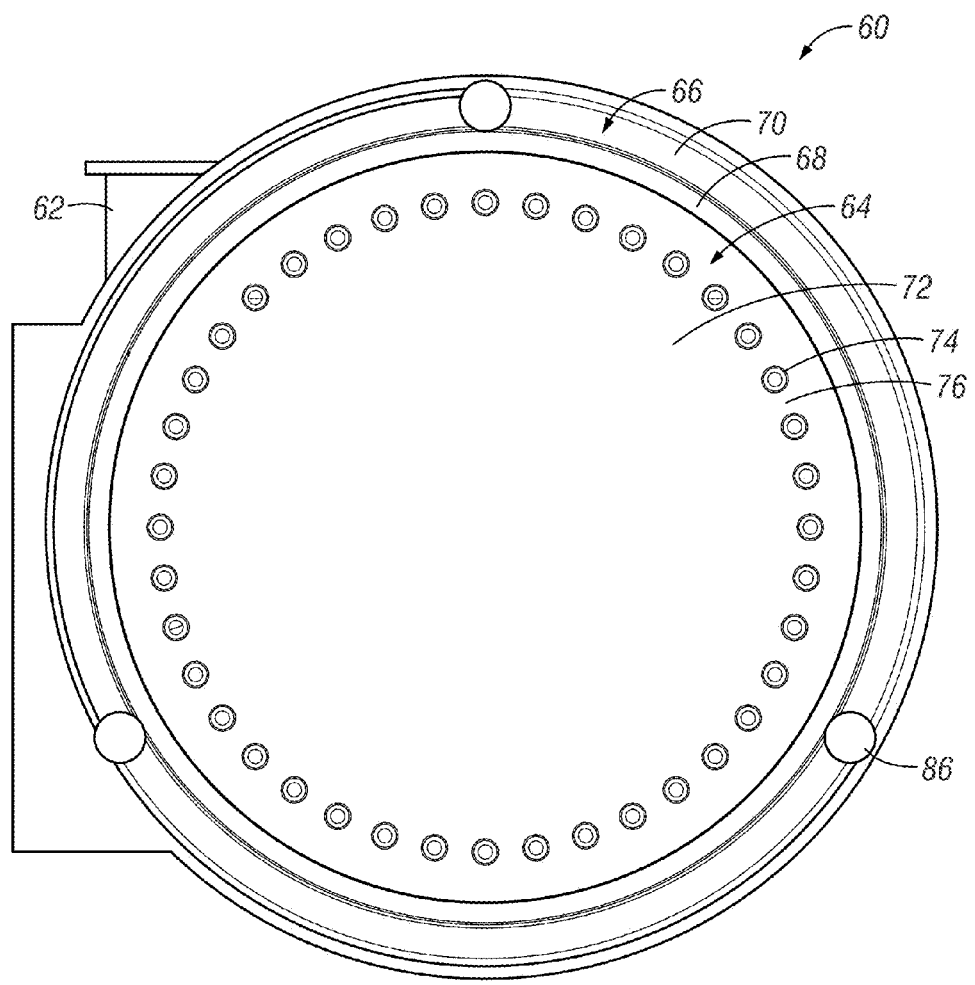
FIG. 8 is a front elevation view of a seed disc with an integrated motor according to additional aspects of the invention.

FIG. 8 shows yet another aspect of the present invention which includes the integration of a motor 66 with a seed disc member 72 to form a seed disc assembly 64. Similar to the configuration shown in FIG. 7, the assembly 64 shown in FIG. 8 includes a brushless DC motor which includes an outer rotating rotor member, which may be shown by reference 70. However, instead of the outer member 70 being permanently fixed or even selectively affixed to the circular member 72 of the seed disc 64, the configuration shown in FIG. 8 includes the use of spinning or friction members 86 based radially about the outer edge of the seed disc member 72. The members 86 can be attached to the rotating rotor 70 of the motor 66. Therefore, when the motor 66 is activated, the outer rotor portion 70 begins to rotate about the central axis. The spinning or friction members 86, which contact the seed disc member 72 at three points around the outer edge of the seed disc 64, will begin to cause rotation of the seed disc member 72 about the central axis 84 as well. This provides a different manner in which the brushless DC motor, which includes reversed outer and inner rotor members, can be used to pause rotation of a seed disc member 72 then a seed meter 60. However, it should also be appreciated that more or less than three contact points be used to aid in the rotation of the seed disc.

Figure 9:
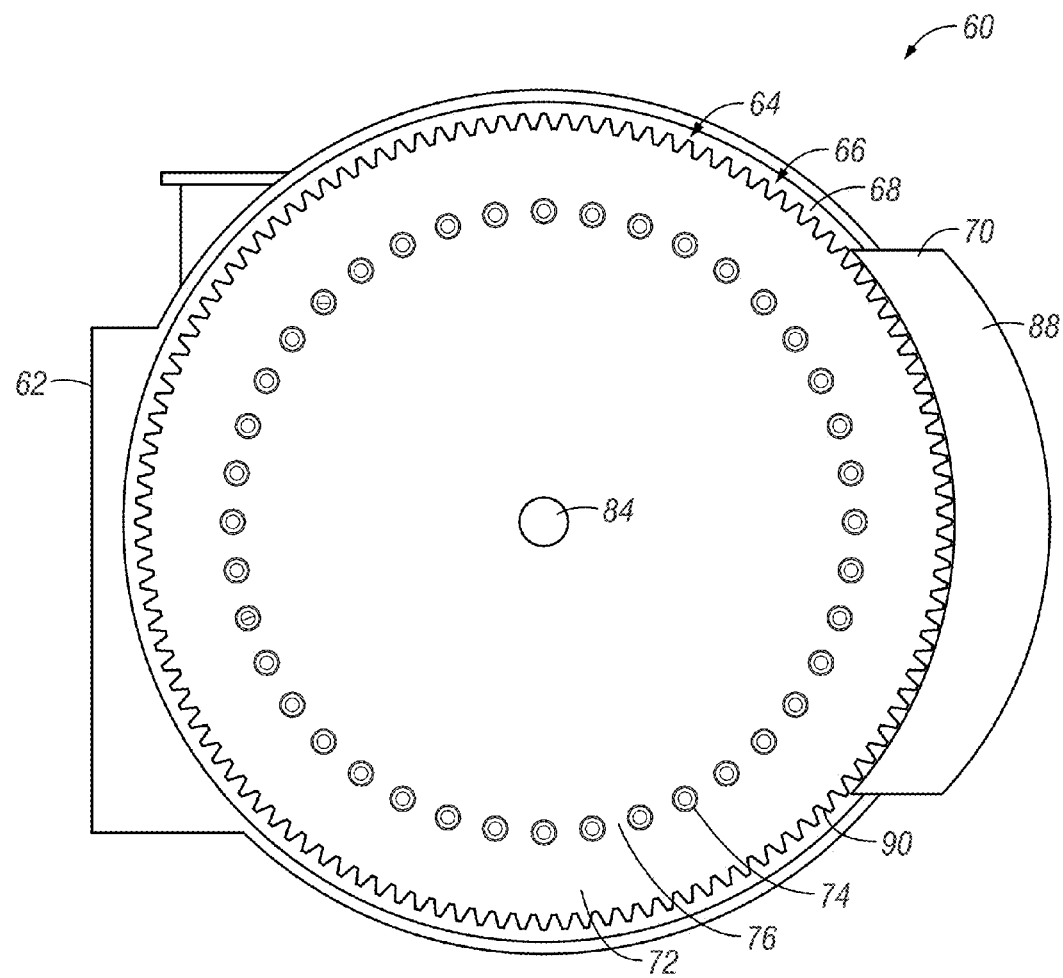
FIG. 9 is a view of a seed disc with an integrated stepper motor.

FIG. 9 discloses yet another embodiment of a motor 66 and seed disc member 72 assembly 64 for providing rotation of the seed disc 64 in a seed meter 60. The motor of FIG. 9 is shown to be a stepper motor 88, and includes teeth portions 90 about an outer periphery thereof, The stepper motor is a type of DC motor that divides a full rotation into a number of equal steps. The motors position can be commanded to move and hold at one of these steps without any feedback sensor, as long as the motor is carefully sized to the application.

Similar to the above, the components of the motor 66 shown in FIG. 9 have been reversed, such that the inner member becomes the substantially stationary stator member 68, while the outer portion becomes the rotational armature or rotor member 70 of the motor. Thus, the introduction of an electric current to wires which are wrapped or coiled around magnets of the inner stator member 68 will cause the permanent magnets of the outer rotor member 70 to rotate about the common central axis 84 thereof. The rotation can be fixed such that equal steps of rotation are experienced by the outer member 70 and thus attach seed disc member 72 about the central axis 84. This will provide an additional aspect of a controlled rotation of the seed disc 64 in the seed meter 60.

Figure 10:
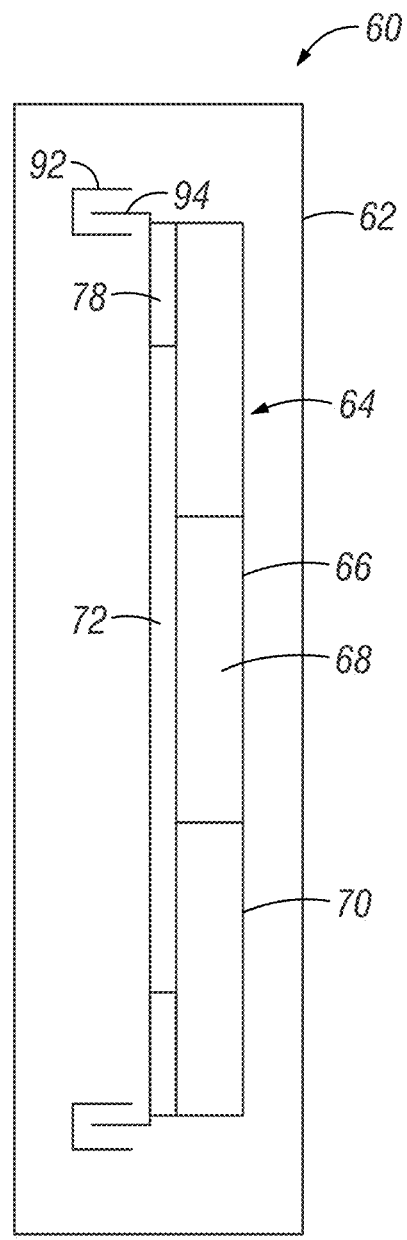
FIG. 10 is a sectional view of a seed meter including a seed disc with an integrated motor.

FIG. 10 shows yet another aspect of the present invention including a seed meter 60. The seed meter 60 includes a seed meter housing 62. Within the seed meter housing 62 is a seed disc assembly 64, which includes a generally circular seed disc member 72 operatively attached or integrated with a motor 66, which may be a brushless electric DC motor. Similar to the previous embodiments, the motor 66 includes a reversed configuration in which the inner portion 68 is a substantially stationary stator member, which may include magnets that are coiled with wires. External to the inner portion 68 is an outer member 70, which may be a rotational rotor or armature member, which may include permanent magnets therein. Thus, the introduction of an electric current to the wires coiled around the magnets of the inner member 68 will work with the permanent magnets of the outer member 70 to cause the outer member 70 to begin rotating about the common axis thereof. The amount of electric current and introduction or stopping of the electric current will provide for a precise control of the rotation of the motor 66.

In the configuration shown in FIG. 10, the substantially or generally circular seed disc member 72 is positioned adjacent the seed disc motor 66, and operatively attached thereof, such as by attachment means 78, 80. Thus, the outer member 70 of the motor 66 can be attached to the seed disc member 72 in any manner. However, as shown in FIG. 10, the seed disc member 72 includes a lip portion 94 which extends generally perpendicular to the seed disc body. The lip portion 94 can be positioned between bearing members 92 positioned within the seed meter housing 62. The bearing members 92 can be generally any bearing member, such as ball bearings, fluid bearings, magnetic bearings, roller bearings, plane bearings, or the like. The bearing members 92 are utilized to reduce the friction and allow for free rotation of the seed disc member 72 in the seed meter housing 62. Thus, rotation of the outer portion 70 of the motor 66 will cause rotation of the seed disc member 72, while the bearing members 92 will provide for ease of rotation within the seed member housing 62.

As mentioned, the bearing members 92 may be generally any bearing member capable of reducing the friction of rotation. For example, the bearing member may be magnetic bearings such that the seed disc 64 is magnetically levitated within the seed meter housing 62 between the bearing members 92. Magnetically levitating the seed disc 64 will reduce friction and wear of the components within the seed meter 60. In addition, the bearing members 92 can be positioned outside the seed pool and can be used with a standard air seed meter 60 such that the seed disc member 72 is rotated through a seed pool with an air source included to provide for a pressure differential through the seed cells 74 of the seed disc 64 to allow for the seed to become affixed or engaged with the seed cells 74 of the seed disc member 72. Continued rotation of the seed disc member 72 through the seed meter 60 will pass the seed through a location of no pressure differential, in which the seed will become dislodged from the seed cell 74 and will drop via the seed meter 60 into a furrow in the field.

Figure 11:
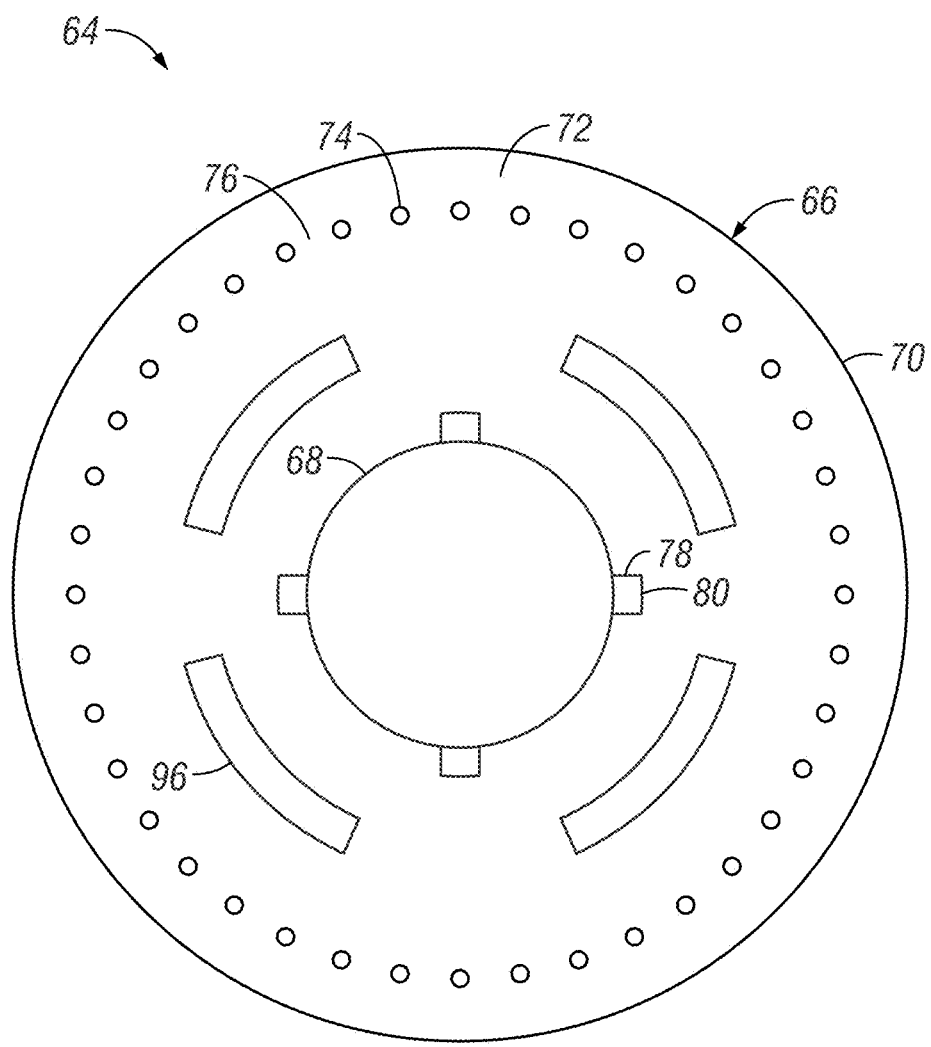
FIG. 11 is a front elevation view of a seed disc with an integrated motor according to additional aspects of the invention.

FIG. 11 discloses yet another embodiment of a seed disc assembly 64. As mentioned, the invention contemplates that the seed disc 64 includes an integrated motor 66 in generally any manner. For example, exemplary examples have been shown and described in which the motor 66 is modularly attached to a ring-shaped seed disc 64, surrounding at least partially a portion of the seed disc 64, positioned adjacent to the seed disc 64, or otherwise surrounding, housed within, housed adjacent, or otherwise attached to the seed disc 64. In the embodiment shown in FIG. 11, the substantially circular member 72 of the seed disc 64 becomes a portion of the motor 66 itself.

For example, as has been mentioned, brushless DC motors utilize the concept of magnets including wires wrapped or coiled around the magnets to create a generally stationary stator member 68. Adjacent the stator member are one or more fixed magnets, which are activated by the introduction of current through the wires to cause the magnets to rotate about or within the stationary stator magnets. The concept of FIG. 11 takes us one step further by including the inner stator member 68. Positioned around and operably attached to the substantially stationary stator member 68 is the generally circular member 72 of the seed disc 64, which may be ring-shaped. Thus, the ring-shaped disc member 72 can be permanently or modularly attached to the stator member 68, such as by snaps, slides, or other means, shown by the numeral 78, 80. Furthermore, the ring-shaped disc member 72 can include magnets or a magnetic material to form the ring-shaped member 72.

FIG. 11 shows the inclusion of permanent magnets 96 housed in and radially spaced about the ring-shaped disc member 72. For example, during molding or otherwise formation of the ring-shaped disc member 72, the magnets 96 can be permanently placed such that they form a portion of the ring-shaped disc member 72. These magnets 96 will then be activated upon the inclusion of the electric current to the stationary stator inner member 68 causing the ring-shaped disc member 72 to begin rotation about the inner stator member 68. Thus, the ring-shaped disc member 72 becomes the portion of both the seed disc 64 and the motor 66 itself. Therefore, instead of permanently affixing the stator member 68 to the seed disc 64, the disc member 72 may be otherwise rotationally connected to the stator member 68, such as by the use of bearings therebetween, which would allow for the rotation of the disc member 72 relative to the stator member 68.

Furthermore, it is contemplated that the ring-shaped disc member 72 comprise a magnetic material, such as by including ferrous or other magnetic materials into the composition of the ring-shaped disc member 72. For example, when determining the composition of the ring-shaped disc member 72, it is contemplated that the ferrous or otherwise magnetic materials be included such as by the inclusion of carbon fibers with magnetic tips, or other means. This would allow the ring-shaped disc member 72 to be substantially magnetic in its whole. Therefore, when the electric current is applied through the coils of the stator member 68, the disc member 72 itself will be the outer, rotor magnet, which will act upon the stator 68 to rotate about the inner and stationary stator member 68. Therefore, this provides yet another way in which the standard DC motor can be manipulated to provide for rotation of the seed disc 66 without the use of an external output shaft. In such embodiments, the control of the rotation of the seed disc member 72 can be controlled by the output of the electric current through the coils of the magnet 96 of the stator 68, which can increase the speed of rotation, stop or start the rotation, or otherwise control the rotation based upon the fundamentals of a DC motor. By making the ring-shaped disc member 72 the rotor itself, the seed meter includes even fewer moving parts that can be damaged during operation of the seed disc.

Furthermore, it is contemplated that the magnetic ring-shaped disc member 72 can be easily replaced about the inner stator member 68 such that the disc member 72 including bearing configurations of seed cells 74 and seed paths 76 can be quickly and easily connected within the seed meter 60 and to the stator 68 such that the seed meter 60 becomes a generally modular member.

Figure 12:
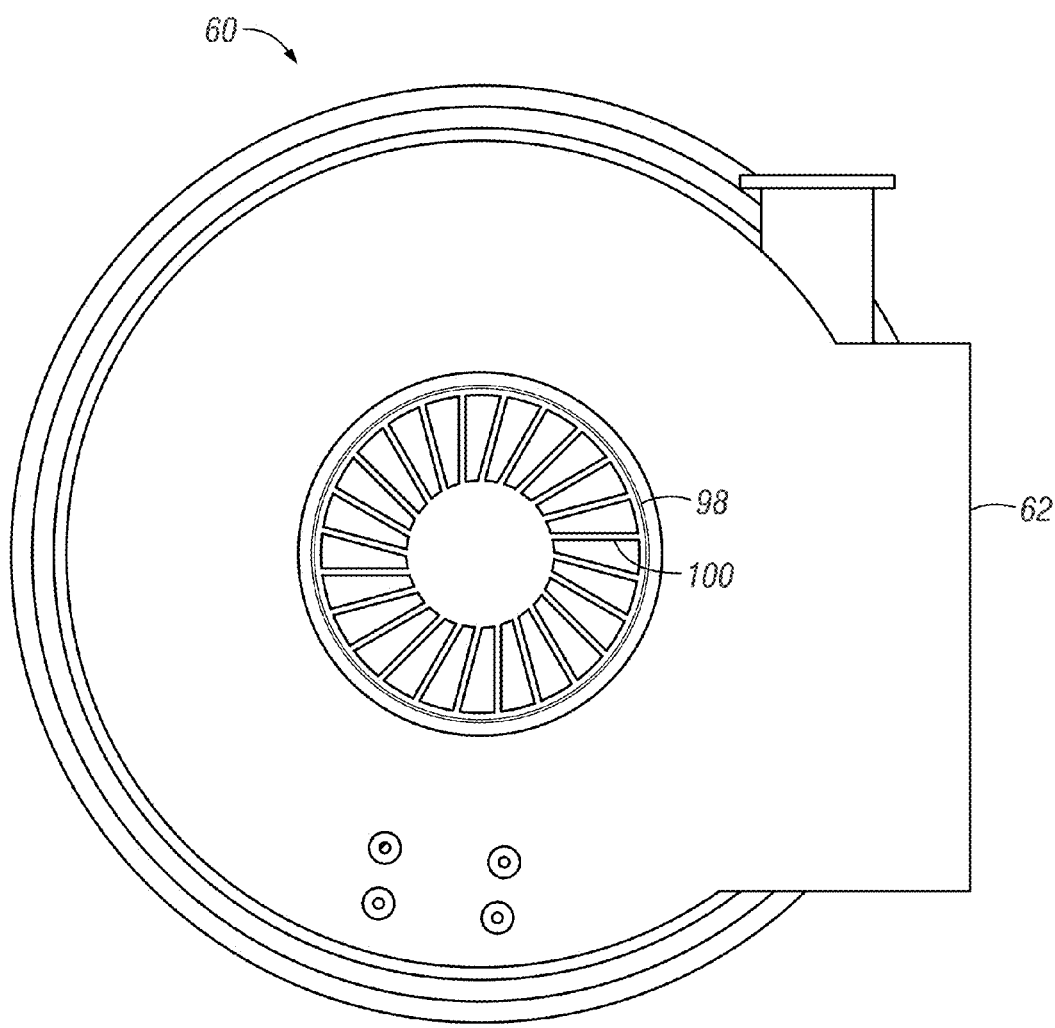
FIG. 12 is an elevation view of a seed meter with an integrated fan for providing a pressure differential to the seed disc.

FIG. 12 shows yet another aspect of the invention, which includes the integration of a fan 98 into the seed meter 60, such as into the seed meter housing 62, in order to provide the pressure differential on opposite sides of the seed disc 64 housed within the housing 62. As mentioned, the invention contemplates the use of heretofore an existing air supply, such as backing hoses attached to the seed meter 60. However, in an effort to further reduce the width and hookups for a seed meter 60, the invention contemplates the integration of a fan member 98 into the seed meter housing 62 itself, to provide for the pressure differential within the housing. The fan 98 may be a pancake fan or other narrow or flat based fan, as is known in the art. The fan 98 can be integrated into the housing 62, such as at the central axis 84, as is shown in FIG. 12. The fan 98 will include a plurality of turbines 100, which when spun, will create a flow that produces a pressure differential on opposite sides of a seed disc 64 housed within the seed meter housing 62. The fan 98 can also be integrated such that it is not an integral part of the seed meter housing 62, but is otherwise attached at an aperture of the seed meter housing 62 in order to provide for the pressure differential within the seed meter housing 62 as well.

Figure 13:
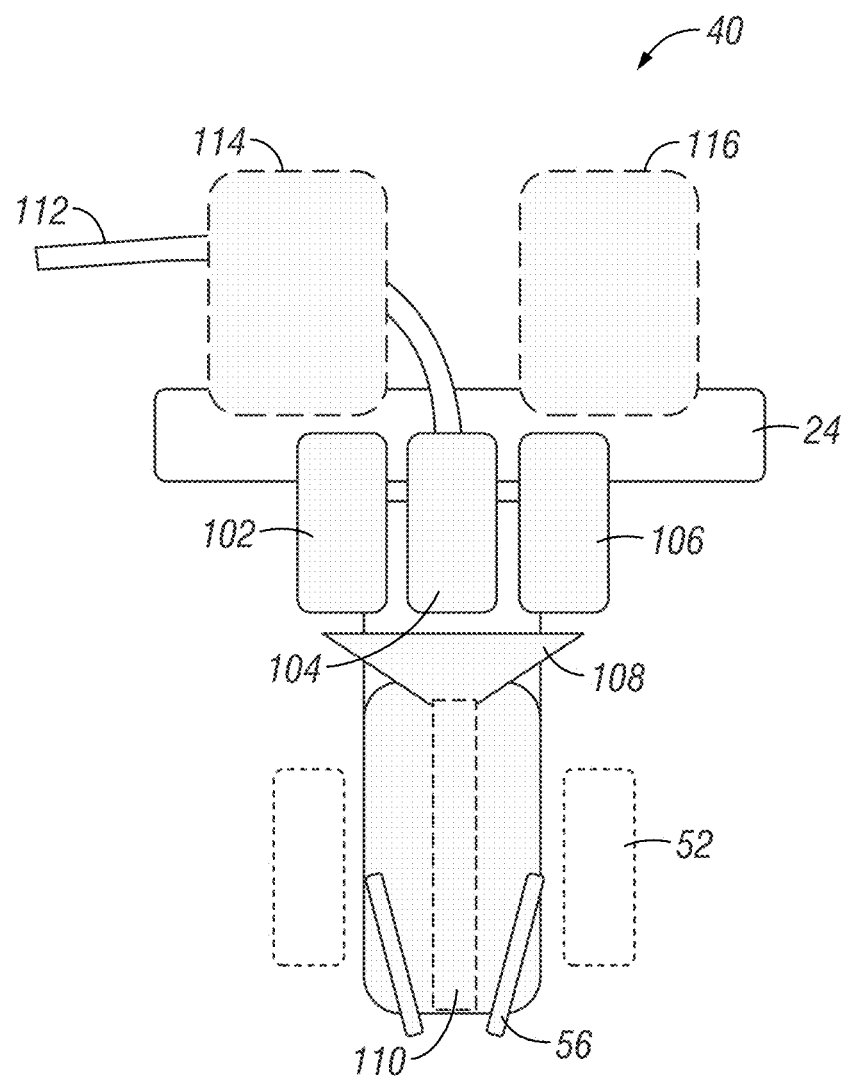
FIG. 13 is a rear view of a row unit with multiple seed meters.

FIG. 13 shows but one possible application of reducing of the seed meter 60 by integrating the drive motor and/or fan of the air seed meters. In the embodiment shown in FIG. 13, a row unit 40 is provided, which allows for multiple hybrid planting. The row unit 40 includes first, second, and third seed meters 102, 104, 106 which are positioned on a single row unit 40 and attached to a frame 24. The reduction of width of the seed meters will allow multiple seed meters to be positioned on a row unit 40, while not increasing the width of the row unit 40 more than what is now included. This will allow existing planters to be retrofit with the reduced width seed meters as well.

The row unit 40 includes a first, second and third seed supply 112, 114 and 116, which supplies different hybrids of seed to each of the seed meters 102, 104, 106. For example, some seed supplies may be hoppers positioned at the row unit 40 while other seed supplies may be air seed delivery systems, in which the hybrid is transported from a central or bulk hopper to each of the row units 40. The present invention is not to be limited to the configuration shown in FIG. 13, and includes generally any possible configuration of seed supplies. Different numbers of seed supply and seed meters may also be used, including, but not limited to, 2, 3, 4, 5, or more units. Examples of row units including a plurality of seed meters are found in U.S. application Ser. No. 14/478,222, which is hereby incorporated in its entirety.

Thus, in operation, as the seed drive motors are integrated with the seed disc 64 within the seed meters 102, 104, 106, to activate each meter, an electric current is to be applied to the selected meter. Therefore, if the central seed meter 104 is to be activated, a control system including an intelligent control or operator control can activate to supply the current to the meter, which will begin rotation of the seed disc 64 within the meter housing. This will pass the disc through a seed pool, and will transfer the seed through a seed funnel 108 and down a seed tube 110 to a furrow in the field, which is then closed by the closing wheels 56. However, due to the electrical nature of the motors of the seed meters, when a different seed meter is to be activated, the current is altered to shut off the seed meter 104 and to activate a different meter instantaneous, such as meter 102. The control of the electric motors via electric currents allows for instantaneous and continuously updating change of hybrids to be planted using the system shown in the row unit 40 of FIG. 13. Furthermore, as mentioned, the reduction of width will allow the seed meters to be positioned on a generally standard row unit 40. In addition, the fan can be shut off or left on when the seed meter is not in use. The fan will be able to maintain a pressure differential, even when the meter is not in use, such that seed is maintained at the seed cells. This aids in the reactivation of the meter so that the seed can dispensed almost instantaneously when the meter is activated.

Thus, the present invention has been shown and described in exemplary embodiments to provide a unique and novel planting system in which a motor is integrated with a seed disc for providing direct driving of the seed disc in a seed meter. While it has been stated that the interior stator is fixed and the rotor rotated about it, it is contemplated in some embodiments that the opposite be true, and the outer rotor member be fixed while the inner stator member be rotatable to drive a seed disc. Furthermore, as has been mentioned, the inclusion of the motor integrated with the disc can allow the seed disc motor to be modular. For example, the invention provides a system in which it is capable of switching out the seed cell profiles to fit the need and desire for the seed to be planted using the same seed meter and motor. Furthermore, it is contemplated that one central or inner stator can be used to power two separate seed discs integrated and operable connected to said stator. Furthermore, in such a situation, one single fan assembly can be positioned between the two discs driven by the common stator to power one or the other such as providing the pressure differential for one or the other.

Furthermore, the invention includes the possibility of a self-contained battery power pack within the seed meter or operably connected to the seed meter such that the seed meters do not need to be run based upon the power supplied by the tractor. Thus, the seed meters can be wholly independent of one another and can be completely self-contained such that they operate themselves based upon a control system which is connected to each of the meters.

In addition, it is contemplated that the seed meters include the use of a sensor to determine a seed that has been attached to a disc. For example, a sensor can be positioned within or adjacent the seed meter housing to determine if a seed is engaged with a seed cell of the seed disc. Such a sensor could take the form of a laser, smart vision, color vision, or the like. Furthermore, it is contemplated that the seed be coated with a material to allow the sensor to indicate whether a seed is attached to the seed disc at a seed cell or not.

The type of motor integrated with the seed disc 64 may be varied to still obtain the benefits, advantages, and objects of the invention. For example, instead of a brushed or brushless DC motor, an axial flux motor may be used. Such a motor may be a type of brushless AC motor. A brushless AC electric motor is an electric motor driven by an AC electrical input, which lacks any form of commutator or slip ring. Generally the term 'brushless AC motor' will refer to a permanent-magnet synchronous motor (PMSM) or permanent-magnet motor (PMM), a synchronous motor which uses permanent magnets rather than windings in the rotor. PMSMs are either axial flux, radial flux, transverse flux, or flux switching depending on the arrangement of components, with each topology having different tradeoffs among efficiency, size, weight, and operating speed. Alternative designs may use reluctance rather than magnets. Asynchronous induction motors are also brushless AC motors.

The axial flux permanent magnet (PM) motor generally includes a pancake shape, compact construction, and high power density. Axial flux PM motors are also called disk-type motors and can be designed as double-sided or single-sided machines, with or without armature slots, with internal or external PM motors and with surface mounted or interior type PMs. As the output power of the axial flux motor increases, the contact surface between the rotor and the shaft becomes smaller.

In such a configuration, the axial flux motor would take the place of the integrated motor, such as that shown in FIG. 4, which would then power the rotation of the seed disc 62 in the seed meter. It should also be appreciated that other types of relatively thin motors may be used instead of those explicitly mentioned to provide for rotation of the seed disc in the meter.

Therefore, a planting implement has been shown and described which includes a seed meter including a seed disc that is integrated with a motor for driving the seed disc within the seed meter. The present invention contemplates numerous variations, options, and alternatives, and is not to be limited to the specific exemplary embodiments described herein. For example, while many embodiments and aspects of the embodiments have heretofore been disclosed, it is contemplated that there may be numerous changes to the exemplary embodiments shown. Those skilled in the art will appreciate the various other changes may be included and still within the scope of the invention.

What is claimed is:

1. A seed disc, comprising:
   a motor including a substantially stationary inner member and a rotatable outer member; and
   a substantially circular member operatively attached to the motor such that rotation of the outer member rotates the circular member;
   wherein the circular member, outer member, and inner member are at least partially coaxial to reduce the axial width of the seed disc.

2. The seed disc of claim 1, wherein the circular member comprises a seed path comprising a plurality of radially spaced seed cells from an axis of the circular member.

3. The seed disc of claim 1, wherein the circular member is positioned at least partially around and connected to the rotatable outer member of the motor.

4. The seed disc of claim 3, wherein the motor comprises at least one attachment member for selectively attaching the motor to the circular member.

5. The seed disc of claim 1, wherein the rotatable outer member of the motor is positioned at least partially around and connected to a portion of the circular member.

6. The seed disc of claim 1, wherein the motor is a brushless DC motor and the outer member is a rotating rotor and the inner member is a stator.

7. The seed disc of claim 6, wherein the rotor rotates upon inclusion of an electric current, and the rotation of the rotor and the circular member is substantially in sync.

8. The seed disc of claim 1, wherein the motor and the circular member comprise an integral, one-piece unit.

9. A seed meter, comprising:
   a seed meter housing; and
   a seed disc positioned within the housing and comprising
      a motor including a substantially stationary inner member and a rotatable outer member, and a substantially circular member operatively attached to the motor such that rotation of the outer member rotates the circular member;
   wherein the circular member, outer member, and inner member are at least partially coaxial to reduce the width of the seed disc.

10. The seed meter of claim 9, wherein the circular member includes a plurality of seed cells spaced radially about an axis of the circular member and configured for retaining seeds.

11. The seed meter of claim 10, further comprising a fan operatively connected to the housing such that the fan provides a pressure differential at a portion of opposite sides of the seed cells of the circular member.

12. The seed meter of claim 11, wherein the fan creates a negative pressure at the seed cells such that a seed within the seed meter housing is temporarily attached to the seed disc due to the negative pressure.

13. The seed meter of claim 9, wherein the motor is positioned at least partially within the diameter of the circular member.

14. The seed meter of claim 9, wherein at least a portion of the rotating outer member of the motor has a diameter greater than that of the circular member.

15. The seed meter of claim 9, wherein the motor is positioned substantially within the circular member.

16. The seed meter of claim 9, wherein the motor is positioned adjacent the circular member within the seed meter housing.

17. An agricultural planter, comprising:
   a plurality of row units operatively attached to a toolbar, each of the row units comprising a seed meter, said seed meter comprising:
      a seed meter housing;
      a seed disc positioned within the housing and comprising
         a motor including a substantially stationary inner member and a rotatable outer member, and a substantially circular member operatively attached to the motor such that rotation of the outer member rotates the circular member; and
      a singulating device for singulating seed attached to the circular member;

wherein the circular member, outer member, and inner member are at least partially coaxial to reduce the width of the seed disc.

18. The agricultural planter of claim 17, further comprising a plurality of seed meters positioned at each row unit, each seed meter including the motor, circular member, and singulating device.

19. The agricultural planter of claim 18, wherein one of the plurality of seed meters is run at a row unit to selectively plant one of a plurality of seed.

20. The agricultural planter of claim 19, further comprising a seed tube positioned at least partially below the plurality of seed meters to receive seed dispensed from any of the meters to direct the dispensed seed towards the ground.

* * * * *